(12) United States Patent
Wan

(10) Patent No.: US 7,748,946 B2
(45) Date of Patent: Jul. 6, 2010

(54) COOLING SYSTEM AND METHOD FOR WIND TURBINE COMPONENTS

(75) Inventor: Rongbo Wan, Hangzhou (CN)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 12/330,844

(22) Filed: Dec. 9, 2008

(65) Prior Publication Data

US 2010/0143126 A1    Jun. 10, 2010

(51) Int. Cl.
*F01D 5/08* (2006.01)
(52) U.S. Cl. .............................. 415/1; 415/116; 416/95
(58) Field of Classification Search .................. 415/1, 415/2.1, 114, 116, 118, 121.2, 175, 177, 415/905; 416/1, 61, 95, DIG. 4
See application file for complete search history.

(56) References Cited

U.S. PATENT DOCUMENTS

| | | | |
|---|---|---|---|
| 4,923,068 A * | 5/1990 | Crowson | .................... 210/741 |
| 5,625,548 A | 4/1997 | Gold et al. | |
| 5,726,873 A | 3/1998 | Gold et al. | |
| 5,953,224 A | 9/1999 | Gold et al. | |
| 6,676,122 B1 * | 1/2004 | Wobben | ...................... 415/119 |
| 7,111,668 B2 * | 9/2006 | Rurup | ...................... 165/134.1 |
| 7,168,251 B1 | 1/2007 | Janssen | |
| 2007/0207721 A1 * | 9/2007 | Chang | ......................... 454/184 |

* cited by examiner

*Primary Examiner*—Igor Kershteyn
(74) *Attorney, Agent, or Firm*—James W. Pemrick; Ernest G. Cusick; Frank A. Landgraff

(57) ABSTRACT

A cooling system and method is provided for a wind turbine. The cooling system is used to cool at least one component in the wind turbine, and includes a filter system having at least one primary filter and at least one secondary filter. A switch selects between the primary filter and the secondary filter. A cooling circuit includes at least one conduit and a coolant medium. The filter system can switch from the primary filter to the secondary filter.

20 Claims, 2 Drawing Sheets

COOLING SYSTEM AND METHOD FOR WIND TURBINE COMPONENTS

BACKGROUND OF THE INVENTION

This invention relates generally to a cooling system and method for a wind turbine, and, in particular, to a cooling system and method for wind turbine components.

A wind turbine comprises several mechanical and electrical components that generate heat energy losses during their operation. These components or units include, for example, a gearbox (if provided) and a generator. Both of these are typically arranged in the nacelle rotatably supported by a tower. The components also include a power converter and a transformer, both of which are typically located within the tower and are utilized to feed electrical energy converted from the mechanical energy of the rotor via the generator into the grid. In addition, the components include controllers for controlling operation of the wind energy turbine. The controllers are typically arranged within the tower. Due to the increased performance of modern wind energy turbines, effective cooling of the above-mentioned components is increasingly difficult.

Typically, the units and components of a wind energy turbine to be cooled are arranged within a cooling air stream generated by fans. However, in particular with respect to the units to be cooled and arranged in the tower of a wind energy turbine, it is difficult to feed enough air into the tower for sufficiently cooling the components. In addition, cooling systems can malfunction and the time needed for repair results in turbine down-time and lost income for the turbine owner.

BRIEF DESCRIPTION OF THE INVENTION

In one aspect of the present invention, a cooling system is provided for a wind turbine. The cooling system is used to cool at least one component in the wind turbine, and includes a filter system having at least one primary filter and at least one secondary filter. A switch selects between the primary filter and the secondary filter. A cooling circuit includes at least one conduit and a coolant medium. The filter system can switch from the primary filter to the secondary filter.

In another aspect of the present invention, a method for cooling at least one component in a wind turbine is provided. The method includes providing a filter system having at least one primary filter and at least one secondary filter. The filter system includes a switch to select between the primary filter and the secondary filter. The method also includes providing a cooling circuit having at least one conduit and a coolant medium. The method includes switching from the primary filter to the secondary filter.

DETAILED DESCRIPTION OF THE INVENTION

Figure 1:
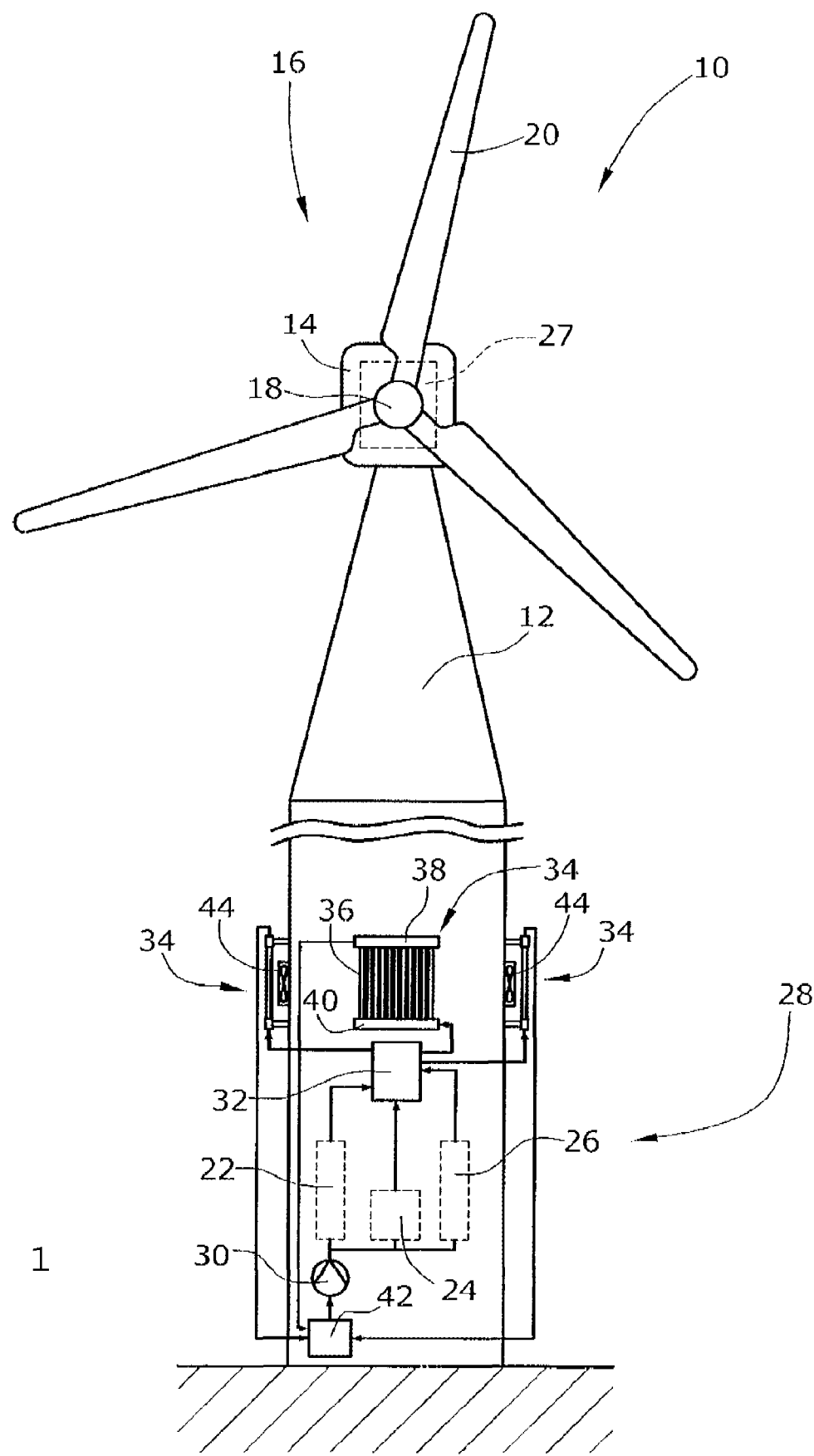
FIG. 1 is a schematic diagram of a wind energy turbine showing a closed cooling circuit.

The present invention involves a cooling system for a wind turbine built as an open loop, partially closed loop, or a completely closed loop. A cooling medium (gas or liquid) flows through the cooling system from at least one unit to be cooled to at least one heat exchanger or cooling element for cooling down the cooling medium. According to one embodiment of the invention, at least one heat exchanger can be located outside of the wind energy turbine and, in particular, on an outer side of the tower and/or nacelle of the wind energy turbine so that it can be cooled by ambient air and wind.

In one embodiment, the cooling components are used in a closed loop cooling circuit with a cooling medium provided as a cooling liquid, e.g. water. The unit or component to be cooled is cooled by the cooling liquid flowing through the unit or component or parts thereof and downstream of the unit or component through at least one heat exchanger located on the outer side of the tower and/or the nacelle. Thereafter, the cooling liquid flows back to the unit or component to be cooled. A pump or similar element is also arranged in the cooling circuit.

In the exemplary embodiment, ambient air and wind are used for cooling the cooling liquid. Arranging at least one heat exchanger outside of the tower substantially improves the effectiveness of the cooling process within the heat exchanger. Since the heat exchanger is attached on the outer side of the tower and/or nacelle and spaced therefrom, the ambient air flows completely around the heat exchanger to effectively cool it. In an alternative embodiment, an air flow generated by a fan is forced through and/or along the at least one heat exchanger. In this embodiment, the heat exchanger and fan arrangement are located e.g. underneath the stairs leading to the tower door. In addition, the fan is arranged at the outer side of the tower or nacelle where the at least one heat exchanger is typically located. Typically, the heat exchanger includes multiple tubes arranged parallel to each other and connected in parallel or in series. When connected in series, the ends of all the tubes are connected to two collection tubes, one of them provided for the heated cooling liquid flowing into the heat exchanger and the other for the cooled cooling liquid flowing out of the heat exchanger.

In alternative embodiments, to further improve the efficiency of cooling the cooling medium, multiple heat exchangers are arranged along the outer circumference of the tower and/or an outer side of the nacelle. The multiple heat exchangers are connected in either series or parallel to each other. In both cases it can be advantageous to cause the cooling medium to flow through selective ones of the heat exchangers, e.g. by closing one or more heat exchangers when connected parallel to each other, for which purpose, in a manifold or the like on/off valves are provided. Alternatively, one or more of the heat exchangers are bypassed when connected in series. The selective use of the heat exchangers makes it possible to e.g. deactivate those heat exchangers which are subjected to ambient heat e.g. due to solar radiation. Accordingly, depending on the position of the sun, the intensity of the solar radiation, the air temperature and/or wind speed, different heat exchangers can be switched on or off so as to use those heat exchangers which are located in the shadow or in partial shadow of the sun. For example activating a heat exchanger subjected to solar radiation can still make sense if the ambient air temperature is low and/or the respective heat exchanger is subjected to air flow due to the ambient wind.

FIG. 1 illustrates a wind turbine 10 comprising a tubular tower 12 and a nacelle 14 rotatably supported at a top of tower 12. A rotor 16 is rotatably supported by nacelle 14 and includes a hub 18 and at least one rotor blade 20. In this embodiment, rotor 16 includes three rotor blades 20. However, the number of rotor blades as well as whether the wind energy turbine is of the vertically rotating rotor type or of the horizontally rotating rotor type, are not essential and this invention applies to both.

Within tower 12, there can be arranged a frequency or power converter 22, a transformer 24, and a controller 26 which are used to convert electrical energy generated by a generator 27 of nacelle 14 and for feeding the electrical energy into a power grid. Frequency converter 22, transformer 24, controller 26, generator 27, and a gearbox (not shown) of nacelle 14 generate energy losses in the form of heat. Accordingly, these components of wind energy turbine 10 have to be cooled. For this purpose, wind energy turbine 10 includes a cooling system, which in the drawings is shown for cooling at least one of the components (converter 22, transformer 24, and controller 26) located in tower 12.

Tower 12 includes, a cooling system 28 built as a completely closed cooling circuit having diverse pipes and elements described hereinafter. Whether or not the cooling circuit is closed is not critical for the invention. The invention can also include an open cooling circuit.

Figure 2:
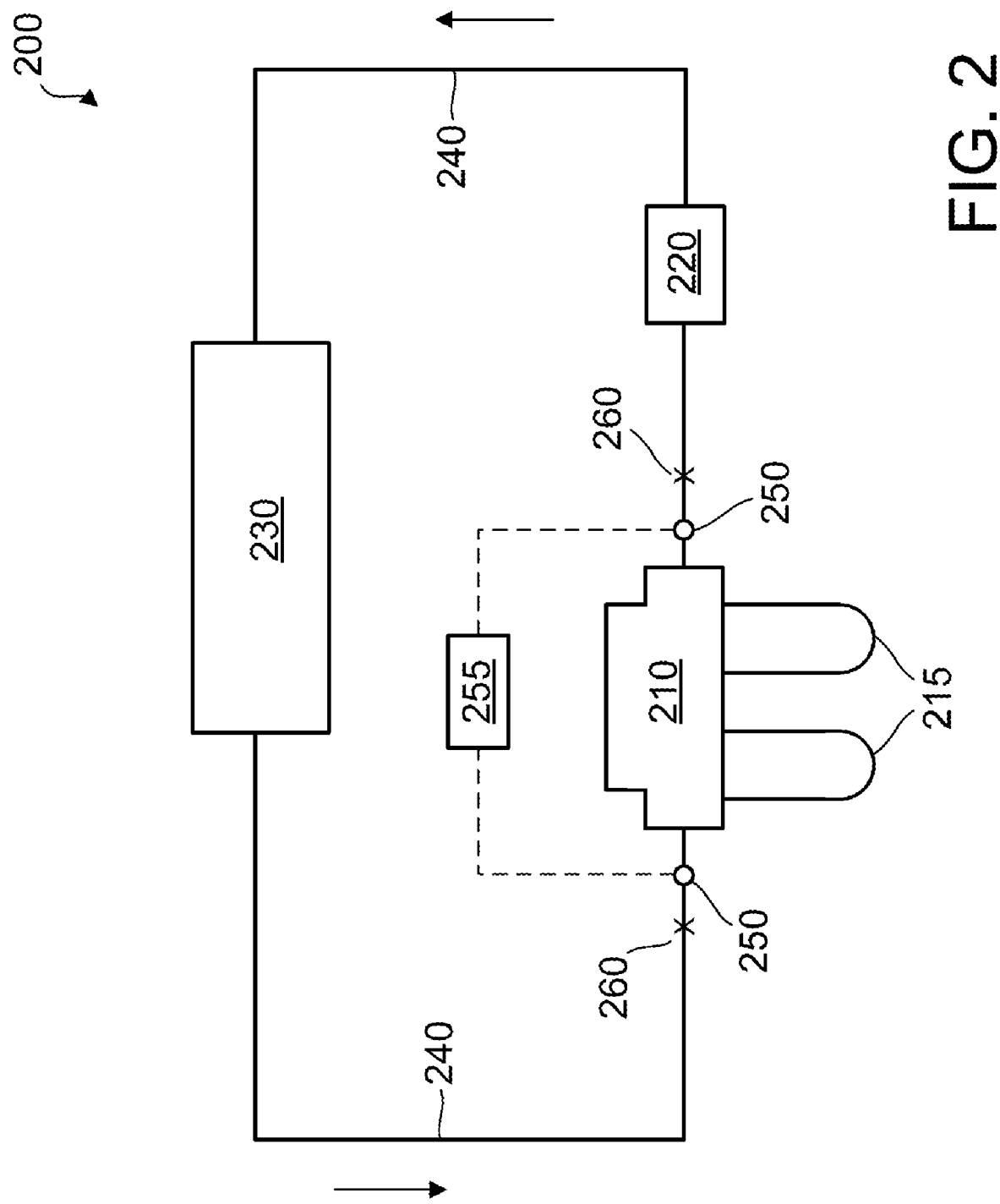
FIG. 2 is a more detailed view of the cooling circuit, according to one embodiment of the present invention.

Cooling system 28 includes a pump 30 for pumping a cooling medium, such as water, through a tube and manifold system as explained. The cooling medium can include, but is not limited to, water, antifreeze, water-antifreeze mixtures, and any other suitable cooling mediums. Pump 30 feeds the cooling medium through the units and components to be cooled (e.g. frequency converter 22, transformer 24, and/or controller 26, as well as generator 27 and/or the gearbox) for cooling these units or components directly or indirectly by e.g. internal heat exchangers. Downstream of the units and components to be cooled, a manifold 32 is provided in cooling system 28 for distributing the cooling medium heated due to the cooling of the units and components to be cooled to multiple heat exchangers 34 arranged outside of tower 12 and attached to the outer side thereof as well as distributed along the peripheral wall of tower 12. Each heat exchanger 34 in this embodiment includes a plurality of tubes 36 connecting upper and lower collecting tubes 38, 40. One of these collecting tubes is in fluid communication with the manifold 32 while the other collecting tube is in fluid communication with another manifold 42 which in turn is connected to pump 30 so as to establish the closed cooling circuit of cooling system 28 as shown in FIGS. 1 and 2. It is to be noted that in FIGS. 1 and 2 the fluid connection within the cooling system is shown schematically. Vertically oriented lines do not necessarily reflect the orientation of the individual pipes. Also the pipes can include cooling fins (not shown).

At least one of manifolds 32 and 42 is provided with valves for selectively connecting the respective manifold to heat exchangers 34. These valves make it possible to selectively use specific ones of heat exchangers 34 for cooling purposes. This in turn can be advantageous in that a heat exchanger 34 which is e.g. heated due to solar radiation, can be shut off from the cooling circuit because such a heat exchanger might not cool the cooling water effectively enough or in a worse case may result in a further heating-up of the cooling water.

The present invention is described in this embodiment with respect to a specific type of heat exchanger 34 as well as a specific arrangement of heat exchangers 34 around tower 12 substantially on one common level. It is to be noted that the type of heat exchanger as well as the aspect of whether the heat exchangers are connected in series or parallel to each other as well as the number and arrangement of the heat exchangers at one or a plurality of different height levels is not important for the invention. The invention utilizes heat exchangers or cooling elements for a cooling medium (liquid or gas) arranged outside of the wind energy turbine, e.g. at the outer side of the nacelle 14 and/or tower 12. However, some or all of the heat exchangers 34 may be located inside tower 12 and/or nacelle 14. It may be desirable for at least some of the heat exchangers to be located inside the tower and/or nacelle for wind turbines situated in cold weather environments. At least one fan 44 can be associated with at least one of heat exchangers 34 for actively feeding air to heat exchanger 34 in addition to the air flow from the wind.

FIG. 2 illustrates a simplified schematic diagram of an improved cooling system 200 for various components in wind turbine 10. A filter 210 incorporates multiple filter elements 215 for improved operation and redundancy.

Cooling system 200 comprises filter 210, pump 220, at least one component to be cooled 230, and pipe or tubing 240. The component to be cooled can include the frequency converter, transformer, controller, generator, gearbox or any other component that may need to be cooled in wind turbine 10. Although not shown in FIG. 2 for clarity, one or more heat exchangers may also be connected to cooling system 200.

Filter 210 includes two or more filter elements 215. In the embodiment illustrated by FIG. 2, two filter elements 215 are shown, but it is to be understood that two or more filter elements could be employed. Filter elements 215 filter out various contaminants in the cooling medium flowing through cooling system 200. As a result, the filter elements can become clogged and require replacement and/or cleaning. In prior, known cooling systems a single filter element was provided and when the filter element became clogged a high pressure was experienced in portions of pipe 240. In some instances the pipe 240 could rupture due to this pressure increase. Accordingly, with the malfunction of cooling system 200 the turbine 10 would need to be shut down for repairs.

The present invention provides an improved filter 210 having multiple filter elements 215. A first filter 215 (e.g., the left filter in FIG. 2) can be designated as the primary filter and be switched into the cooling medium flow. A second filter 215 (e.g., the right filter in FIG. 2) can be designated as a secondary or backup filter. The pressure differential between the input and output of filter 210 can be sensed by pressure sensors 250 and can be evaluated by a controller 255. In some embodiments of the present invention, controller 255 may be controller 26 as shown in FIG. 1.

If the pressure differential exceeds a predetermined threshold, then a clogged filter may be detected. Filter 210 can switch out the clogged filter element and switch in the secondary or backup filter. In this manner coolant medium flow is not interrupted and the cooling system 200 can continue operating. A signal can be sent by controller 255 to a monitoring location (which may be remote from turbine 10) to indicate that filter replacement is needed. Service personnel can schedule this repair and replace or repair the clogged filter element. The newly replaced filter element can be designated as the secondary filter element.

According to additional aspects of the present invention, a single differential pressure switch may be employed that has two inputs. A first input would be connected to the input side of filter 210, and a second input would be connected to the output side of filter 210. The differential pressure switch could have communication capability to communicate with a controller 255 or other local or remote monitoring device.

If a differential pressure value approached a predetermined threshold, a signal can be sent to local or remote monitoring devices, as well as filter element 210. In addition, the signal may also be used by filter 210 to automatically switch to the secondary filter element.

Shut-off valves 260 may also be located at the input and output sides of filter 210. If the shut-off valves 260 are located upstream and downstream of the pressure sensors 250, respectively, then the entire filter assembly 210 and the sensors 250 can be easily repaired or replaced.

A filter having two filter elements has been described, however, any suitable number of filter elements could be employed in the improved cooling system of the present invention. For example, a filter having two or more primary filter elements and two or more secondary elements could be employed. The present invention also contemplates a system having multiple secondary filters. For example, two or more secondary filters could be used and switched in as needed. A first secondary filter could be used first, followed by a second secondary filter if the first secondary filter became clogged. In addition, the communication between the sensors 250 and controller 255 may be wired or wireless.

Accordingly, although the invention has been described and illustrated with reference to a specific illustrative embodiment thereof, it is not intended that the invention be limited to this illustrative embodiment. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A cooling system for a wind turbine, said cooling system used to cool at least one component in said wind turbine, said cooling system comprising:
   a filter system comprising at least one primary filter and at least one secondary filter, said filter system including a switch to select between said at least one primary filter and said at least one secondary filter;
   a cooling circuit comprised of at least one conduit and a coolant medium;
   a pressure sensing system to sense the pressure differential between an input of the filter system and an output of the filter system, wherein a signal can be sent to the filter system when the pressure differential exceeds a predetermined threshold value, thereby indicating that the at least one primary filter is experiencing reduced flow; and
   wherein said filter system switches from said at least one primary filter to said at least one secondary filter, the switch having a first configuration where the coolant medium is routed through the primary filter but not the secondary filter, and the switch having a second configuration where the coolant medium is routed through the secondary filter but not the primary filter.

2. The cooling system of claim 1, wherein at least two pressure detectors are placed in said cooling circuit.

3. The cooling system of claim 1, further comprising:
   a first pressure detector located near said input of said filter system; and
   a second pressure detector located near said output of said filter system.

4. The cooling system of claim 1, wherein said pressure sensing system comprises a differential pressure switch, said differential pressure switch comprising:
   a first input connected near the input of said filter system; and
   a second input connected near the output of said filter system.

5. The cooling system of claim 1, wherein said signal is sent directly from said pressure sensing system to said filter system.

6. The cooling system of claim 1, wherein said signal is sent directly from said pressure sensing system to a wind turbine controller.

7. The cooling system of claim 1, wherein said at least one component is chosen from the group comprising: converter, power converter, frequency converter, transformer, controller, generator, and gearbox.

8. The cooling system of claim 1, further comprising:
   a first shut-off valve located in said cooling circuit and near an input of said filter system; and
   a second shut-off valve located in said cooling circuit and near an output of said filter system;
   wherein, said first shut-off valve and said second shut-off valve can be configured to isolate said filter system from said cooling circuit.

9. The cooling system of claim 1, further comprising:
   a first shut-off valve located in said cooling circuit and upstream of a first pressure sensor and said filter system; and
   a second shut-off valve located in said cooling circuit and downstream of a second pressure sensor and said filter system;
   wherein, said first shut-off valve and said second shut-off valve can be configured to isolate said first pressure sensor, said second pressure sensor and said filter system from said cooling circuit.

10. A method for cooling at least one component in a wind turbine, said method comprising:
    providing a filter system, said filter system comprising at least one primary filter and at least one secondary filter, said filter system including a switch to select between said at least one primary filter and said at least one secondary filter;
    providing a cooling circuit comprised of at least one conduit and a coolant medium;
    providing a pressure sensing system to sense the pressure differential between an input of said filter system and an output of said filter system;
    transmitting a signal to said filter system when said pressure differential exceeds a predetermined threshold value, thereby indicating that said at least one primary filter is experiencing reduced flow, and
    switching from said at least one primary filter to said at least one secondary filter.

11. The method of claim 10, wherein at least two pressure detectors are placed in said cooling circuit.

12. The method of claim 10, wherein a first pressure detector is located near said input of said filter system, and a second pressure detector is located near said output of said filter system.

13. The method of claim 10, wherein said pressure sensing system comprises a differential pressure switch, said differential pressure switch comprising:
    a first input connected near the input of said filter system; and
    a second input connected near the output of said filter system.

14. The method of claim 10, wherein said signal is sent directly from said pressure sensing system to said filter system.

15. The method of claim 10, wherein said signal is sent directly from said pressure sensing system to a wind turbine controller.

16. The method of claim 10, wherein said at least one component is chosen from the group comprising: converter, power converter, frequency converter, transformer, controller, generator, and gearbox.

17. The method of claim 10, further comprising:
    providing a first shut-off valve located in said cooling circuit and located near an input of said filter system; and
    providing a second shut-off valve located in said cooling circuit and located near an output of said filter system;

wherein, said first shut-off valve and said second shut-off valve can be configured to isolate said filter system from said cooling circuit.

18. The method of claim 10, further comprising:

providing a first shut-off valve located in said cooling circuit and upstream of a first pressure sensor and said filter system; and providing a second shut-off valve located in said cooling circuit and downstream of a second pressure sensor and said filter system;

wherein, said first shut-off valve and said second shut-off valve can be configured to isolate said first pressure sensor, said second pressure sensor and said filter system from said cooling circuit.

19. A wind turbine having a cooling system used to cool at least one component in the wind turbine, the wind turbine comprising:

a tower;

a nacelle;

at least one component to be cooled housed within at least one of the tower and the nacelle;

a filter system comprising a primary filter and a secondary filter, the filter system including a switch to select between the primary filter and the secondary filter;

a cooling circuit comprised of at least one conduit and a coolant medium;

wherein the filter system switches from the primary filter to the secondary filter, the switch having a first configuration where the coolant medium is routed through the primary filter but not the secondary filter, and the switch having a second configuration where the coolant medium is routed through the secondary filter but not the first filter.

20. The wind turbine of claim 19, further comprising:

a pressure sensing system to sense the pressure differential between an input of the filter system and an output of the filter system;

a first pressure detector located near said input of said filter system;

a second pressure detector located near said output of said filter system; and wherein a signal can be sent to the filter system when the pressure differential exceeds a predetermined threshold value, thereby indicating that the primary filter is experiencing reduced flow.

* * * * *